United States Patent [19]

Hoheisel et al.

[11] 4,110,813
[45] Aug. 29, 1978

[54] IGNITION DEVICE FOR PASSIVE RETENTION SYSTEM

[75] Inventors: Peter-Matthias Hoheisel, Esslingen; Gerhard Komander, Altbach, both of Fed. Rep. of Germany

[73] Assignee: Daimler-Benz Aktiengesellschaft, Fed. Rep. of Germany

[21] Appl. No.: 641,772

[22] Filed: Dec. 17, 1975

[30] Foreign Application Priority Data

Dec. 20, 1974 [DE] Fed. Rep. of Germany ....... 2460427

[51] Int. Cl.$^2$ ................................................ F42C 19/02
[52] U.S. Cl. ................................. 361/248; 102/28 R; 280/728
[58] Field of Search ................... 123/145 R, 145 A; 317/98, 2 R; 219/260, 267, 270, 336; 280/728, 741, 736, 734; 102/28 M, 28 R, 28 S; 431/98, 97, 95; 361/248

[56] References Cited

U.S. PATENT DOCUMENTS

| 1,609,688 | 12/1926 | Briggs | 123/145 A |
|---|---|---|---|
| 2,030,937 | 2/1936 | Reichmann | 123/145 A |
| 2,099,737 | 11/1937 | Hopkins | 123/145 A |
| 2,738,967 | 3/1956 | Ferguson | 123/145 A |
| 2,801,585 | 8/1957 | Smith | 102/28 M |
| 2,934,014 | 4/1960 | Smith et al. | 102/70.2 A |
| 3,244,103 | 4/1966 | Spickard | 102/28 R |
| 3,360,760 | 12/1967 | Johnson | 317/98 |
| 3,562,590 | 2/1971 | Mitts et al. | 317/98 |
| 3,638,071 | 1/1972 | Altonen, Jr. et al. | 317/2 R |
| 3,638,964 | 2/1972 | Chute | 280/736 |
| 3,695,178 | 10/1972 | Betts | 102/28 R |
| 3,695,179 | 10/1972 | Rainone et al. | 280/741 |
| 3,813,112 | 5/1974 | Hermann | 280/736 |

FOREIGN PATENT DOCUMENTS

647,178 12/1950 United Kingdom .................... 219/336

Primary Examiner—J. V. Truhe
Assistant Examiner—Clifford C. Shaw
Attorney, Agent, or Firm—Craig & Antonelli

[57] ABSTRACT

An ignition device for a passive retention system, especially in motor vehicles, in which an ignition unit fitted into a housing includes two plug pins which protrude on one side with their free ends out of a covering and which, on the other side, are connected with a heater bridge and are surrounded by an ignition substance within a casing.

18 Claims, 3 Drawing Figures

IGNITION DEVICE FOR PASSIVE RETENTION SYSTEM

The present invention relates to an ignition device for a passive retention system, especially in motor vehicles, by means of which a gas-producing ignition composition in a gas generator can be ignited or fired.

The present invention is concerned with the task to realize with the use of means simple from a structural and manufacturing point of view, as compact as possible a construction of an ignition device having an ignition unit in such a manner that a manufacture satisfactory from a manufacturing point of view, a rapid assembly with tight installation, a protection against external damages and vibrational stresses and therewith a simple handling with high operating safety are assured.

The underlying problems are solved according to the present invention in that an ignition unit fitted into a housing includes two connecting or plug-in pins which protrude on one side with their free ends out of an envelope, covering or coupling, and which, on the other side, are connected with a filament of heater bridge and are surrounded by an ignition composition disposed within a casing.

According to one feature of the present invention, the covering or coupling consists of a socket or base which passes over into a conical chamfering with an adjoining adapter smaller in cross section.

According to a further feature of the present invention, the socket or base, the chamber and the adapter are coated with an elastic material, or consist altogether of an elastic material, for example, of conventional synthetic resinous material suitable therefor.

A favorable construction of the present invention resides in that the housing is provided inwardly thereof on the gas generator side with a bore which passes over into a conical sealing surface with an adjoining constriction, whose length is constructed shorter compared to the length of the adapter of the ignition unit, and in that the housing is provided inwardly on the coupling side with another bore which is provided with a groove and an undercut.

The present invention is characterized above all in that the free ends of the plug-in or connecting pins can be protected prior to use by a dummy coupling of elastic material, for example, of synthetic resinous material, adapted to be clipped into the bore, which engages with a circumferential detent edge into the undercut and is retained safe against rotation by a nose in a groove, and in that the dummy coupling includes a collar in which is arranged a protective contact strip adapted to be brought into contact with the connector or plug-in pins.

Finally, the free ends of the plug-in or connecting pins are connected in the operating condition with a contact coupling adapted to be clipped in, which is interchangeable with the protective dummy coupling.

Accordingly, it is an object of the present invention to provide an ignition device for a passive retention system which avoids by simple means the aforementioned shortcomings and drawbacks encountered in the prior art.

Another object of the present invention resides in an ignition device for a passive retention system, especially in motor vehicles, which enables a satisfactory manufacture, rapid assembly, tight seal, and a protection against external damages and vibrational loads.

A still further object of the present invention resides in an ignition device for a passive retention system, especially in motor vehicles, which assures simple handling with high operating reliability.

Still another object of the present invention resides in an ignition device for a passive retention system which is simple in construction, easy to install and utilizes relatively few parts.

A further object of the present invention resides in an ignition device for a passive retention system in which the plug pins can be effectively protected and by simple means prior to use of the device in the installed condition.

These and other objects, features and advantages of the present invention will become more apparent from the following description when taken in connection with the accompanying drawing, which shows, for purposes of illustration only, one embodiment in accordance with the present invention, and wherein.

Figure 1:
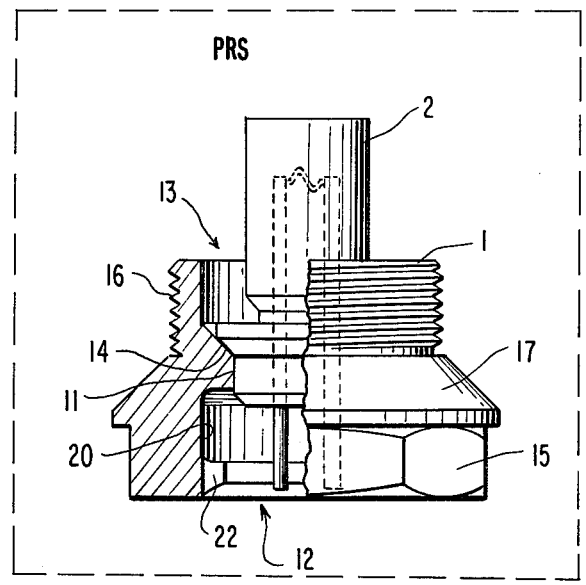
FIG. 1 is an elevational view, partly in cross section, of an ignition device in accordance with the present invention.
Figure 2:
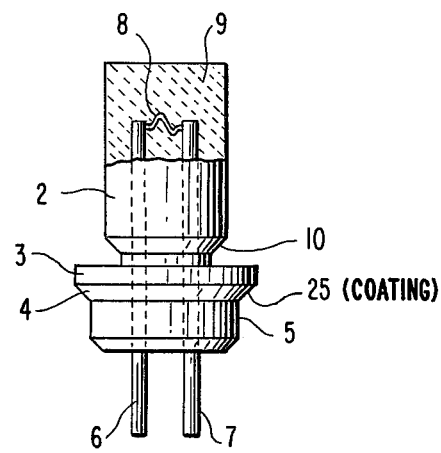
FIG. 2 is an elevational view, partly broken away, of an ignition unit in accordance with the present invention.

Referring now to the drawing wherein like reference numerals are used throughout the various views to designate like parts, FIG. 1 illustrates an ignition unit 2 fitted or coupled into a housing 1 by means of a press-fit and forming part of a passive retention system schematically illustrated as a block in dashed line and lablelled PRS; the ignition unit 2 is again illustrated by itself as individual part in FIG. 2. This ignition unit 2 consists of coupling port having a base or socket 3 which includes a chamfering portion 4 and passes over into a cylindrical adapter portion 5, and which is covered by a tough-elastic, temperature-resistant synthetic resinous material 25, for example, by a polyamide or is made also from this material. The two plug-in or connecting pins 6 and 7 are molded-in into this socket 3 or are cast integral therewith and are provided with a heater or filament bridge 8 which is surrounded by the ignition composition, properly speaking, within a casing 9 that may be constructed cylindrically shaped. The casing 9 is rolled onto an undercut (not shown) of the socket 3 within the area of the place 10 or is welded together or glued together with a collar at the undercut of the base or socket 3. The casing 9 serves both for the damping and guidance of the ignition composition as also for the effective protection of the welded-in filament bridge 8 against vibrational loads. The ignition composition may be contacted in a known manner as complete structural unit at the end of the plug-in or connecting pins 6 and 7 or may also be formed directly at the plug-in or connecting pins 6 and 7 with the socket 3 after the filament bridge 8 is welded-on. The latter, in addition to the advantage of a slight structural height of the ignition unit 2 due to the omission of a contact or coupled place, offers the additional advantage of greater operating safety.

The cylindrical adapter portion 5 of the base or socket 3 of the ignition unit 2 is made of oversize and is connected with the housing 1 by being pressed-in into a smaller bore constructed as cylindrical constriction 11 within the housing 1. After the pressing-in operation, the synthetic resinous material again yields at the place underneath the constriction 11 due to its creep behavior. As a result thereof, the shape of the part of the adapter 5 which protrudes beyond the constricted place 11 also again increases and thus produces a counterforce against the plug-in force of the contact coupling adapted to be clipped in. Additionally, an absolute water-tight installation can be achieved on the coupling side 12 circumferentially about the adapter 5 by means of a sealing compound or filler.

The sealing on the gas generator side 13 takes place by means of abutment pressure due to the combustion pressure after the ignition whereby the conical chamfering 4 is being pressed against the matched countersealing surface 14 in the housing 1. The housing 1 closes the gas generator in that it is screwed-on by way of a key or wrench surface 15 against a conical seat 17 by means of a threaded part 16.

Figure 3:
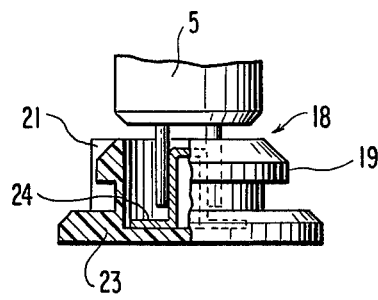
FIG. 3 is an elevational view, partly in cross section, of a dummy coupling for use with the ignition unit in accordance with the present invention.

FIG. 3 illustrates a dummy coupling 18 adapted to be clipped, in which engages with a circumferential detent edge 19 (FIG. 3) into an undercut 20 (FIG. 1) of the housing 1 and is retained safe against rotation in a groove 22 by a nose 21. A protective contact strip 24 matched so as to contact the plug pins 6 and 7 is arranged in a collar 23 of the dummy coupling 18. In this embodiment the blind coupling 18 protects the plug pins 6 and 7 against damages which may occur during transport and during the installation and simultaneously effectively prevents an unintentional ignition due to electrostatic charges.

After the completed installation of the ignition device, the condition ready for operation is established in that the protective dummy coupling 18 is exchanged for a contact coupling which is operatively connected with the electric power supply of the motor vehicle by way of a sensor.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An ignition device for a passive retention system, characterized in that an ignition unit for being coupled into a housing means includes two connecting pins having free ends projecting out of a coupling means of the ignition unit, the connecting pins being operatively connected in the region of the opposite ends thereof with a filament means, the filament means being surrounded by an ignitable ignition composition arranged within a casing means, the coupling means including a socket member having a predetermined configuration prior to coupling with the housing means, the socket member being provided with a portion having a first cross section adjoining a conical chamfered portion, the conical chamfered portion adjoining an adapter portion having a smaller cross section than the first cross section, the coupling means enabling a rapid installation and tight seal of the ignition unit with the housing means upon coupling.

2. An ignition device according to claim 1, characterized in that the filament means is a heater bridge.

3. An ignition device according to claim 1, characterized in that the ignition device includes means for accommodating disposition thereof as an operative part of a passive retention system in motor vehicles.

4. An ignition device according to claim 1, characterized in that at least the chamfered portion and the adapter portion are coated with an elastic material on the surface thereof.

5. An ignition device according to claim 1, characterized in that at least the chamfered portion and the adapter portion essentially consist of elastic material.

6. An ignition device according to claim 5, characterized in that the elastic material is a synthetic resinous polyamide material.

7. An ignition device according to claim 1, characterized in that a housing means for receiving the ignition unit is provided, the housing means being provided inwardly thereof in the proximity of the ignition composition portion of the ignition unit on the gas generator side with a bore at least partially delimited by a conical sealing surface with an adjoining constriction portion for receiving and engaging the adapter portion of the ignition unit, the constriction portion having a length which is shorter compared to the length of the adapter portion of the ignition unit.

8. An ignition device according to claim 7, characterized in that the housing means is provided inwardly thereof in the proximity of the projecting free ends of the connecting pin with another bore being at least partially delimited by a groove and an undercut portion.

9. An ignition device according to claim 8, characterized in that a dummy coupling means is provided for clipping-in into the another bore of the housing means so as to protect the free ends of the connecting pins prior to use, said dummy coupling means engaging with a circumferential detent edge into the undercut portion of the housing means and being retained safe against rotation in the groove by a nose portion, said dummy coupling means including a collar, in which is arranged a protective contact strip for engaging with the connecting pins.

10. An ignition device according to claim 9, characterized in that the dummy coupling means consists of synthetic resinous material.

11. An ignition device according to claim 9, characterized in that the free ends of the connecting pins are arranged for connection in an operating condition with a contact coupling means arranged for clipping-in connection with the connecting pins and which is interchangeable for the protective dummy coupling means.

12. An ignition device according to claim 9, characterized in that at least the adapter portion is coated with an elastic material or consists of an elastic material, the adapter portion upon receipt within the constriction portion of the housing means having a part which expands beyond the constriction portion.

13. An ignition device according to claim 1, characterized in that a housing means for receiving the ignition unit is provided, the housing means being provided inwardly thereof in the proximity of the ignition composition portion of the ignition unit with a bore at least partially delimited by a conical sealing surface with an adjoining constriction portion for receiving and engaging the adapter portion of the ignition unit.

14. An ignition device according to claim 13, characterized in that the housing means is provided inwardly thereof in the proximity of the projecting free ends of the ignition unit with another bore at least partially delimited by a groove and an undercut portion.

15. An ignition device according to claim 1, characterized in that the free ends of the connecting pins are arranged for connection in an operating condition with a contact coupling means arranged for clipping-in connection with the connecting pins.

16. An ignition device according to claim 1, wherein the ignition composition is responsive to energization of the filament means for being ignited.

17. An ignition device according to claim 1, wherein the filament means is embedded in the ignition composition.

18. An ignition device according to claim 1, wherein the ignition composition is a gas producing composition generating gas for a passive retention system in a motor vehicle, the ignition device including means for accommodating disposition thereof as an operative part of the passive retention system.

* * * * *